United States Patent
Shah et al.

(10) Patent No.: US 11,693,831 B2
(45) Date of Patent: Jul. 4, 2023

(54) SECURITY FOR DATA AT REST IN A REMOTE NETWORK MANAGEMENT PLATFORM

(71) Applicant: ServiceNow, Inc., Santa Clara, CA (US)

(72) Inventors: Siddharth Rajendra Shah, Kirkland, WA (US); Jeremy Norris, San Diego, CA (US)

(73) Assignee: ServiceNow, Inc., Santa Clara, CA (US)

( * ) Notice: Subject to any disclaimer, the term of this patent is extended or adjusted under 35 U.S.C. 154(b) by 169 days.

(21) Appl. No.: 17/101,421

(22) Filed: Nov. 23, 2020

(65) Prior Publication Data
US 2022/0164319 A1  May 26, 2022

(51) Int. Cl.
*G06F 16/188* (2019.01)
*G06F 16/18* (2019.01)
(Continued)

(52) U.S. Cl.
CPC .......... *G06F 16/196* (2019.01); *G06F 16/176* (2019.01); *G06F 16/1734* (2019.01);
(Continued)

(58) Field of Classification Search
CPC .. G06F 16/196; G06F 16/1734; G06F 16/176; G06F 16/1847; G06F 21/602; G06F 21/6218; G06F 3/0662; G06F 2009/45583
See application file for complete search history.

(56) References Cited

U.S. PATENT DOCUMENTS

| | | | |
|---|---|---|---|
| 4,941,084 A | 7/1990 | Terada et al. | |
| 5,185,860 A | 2/1993 | Wu | |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

Nick Congleton, "Basic Guide To Encrypting Linux Partitions With LUKS," LinuxConfig.org, Aug. 20, 2018.
(Continued)

*Primary Examiner* — Hosain T Alam
*Assistant Examiner* — Chongsuh Park
(74) *Attorney, Agent, or Firm* — McDonnell Boehnen Hulbert & Berghoff LLP

(57) ABSTRACT

An embodiment may involve persistent storage including a parent filesystem and a pre-configured amount of free space within the parent filesystem that is dedicated for shared use. The embodiment may also involve one or more processors configured to, for each of a plurality of child filesystems: create a sparse file with an apparent size equivalent to the pre-configured amount of free space; create a virtual mapped device associated with the sparse file; establish one or more cryptographic keys for the virtual mapped device; create an encrypted virtual filesystem for the virtual mapped device and within the sparse file, wherein the encrypted virtual filesystem uses the cryptographic keys for application-transparent encryption and decryption of data stored by way of the encrypted virtual filesystem; and mount the encrypted virtual filesystem within the parent filesystem as one of the child filesystems.

20 Claims, 13 Drawing Sheets

(51) Int. Cl.
  *G06F 16/176* (2019.01)
  *G06F 16/17* (2019.01)
  *G06F 21/60* (2013.01)
  *G06F 21/62* (2013.01)

(52) U.S. Cl.
  CPC ........ *G06F 16/1847* (2019.01); *G06F 21/602* (2013.01); *G06F 21/6218* (2013.01)

(56) References Cited

U.S. PATENT DOCUMENTS

| | | | |
|---|---|---|---|
| 5,237,518 A | 8/1993 | Sztipanovits et al. | |
| 5,261,097 A | 11/1993 | Saxon | |
| 5,265,252 A | 11/1993 | Rawson, III et al. | |
| 5,367,685 A | 11/1994 | Gosling | |
| 5,390,297 A | 2/1995 | Barber et al. | |
| 5,442,791 A | 8/1995 | Wrabetz et al. | |
| 5,452,415 A | 9/1995 | Hotka | |
| 5,522,042 A | 5/1996 | Fee et al. | |
| 5,533,116 A | 7/1996 | Vesterinen | |
| 5,655,081 A | 8/1997 | Bonnell et al. | |
| 5,659,736 A | 8/1997 | Hasegawa et al. | |
| 5,671,412 A | 9/1997 | Christiano | |
| 5,696,701 A | 12/1997 | Burgess et al. | |
| 5,715,463 A | 2/1998 | Merkin | |
| 5,745,879 A | 4/1998 | Wyman | |
| 5,761,502 A | 6/1998 | Jacobs | |
| 5,764,913 A | 6/1998 | Jancke et al. | |
| 5,887,139 A | 3/1999 | Madison, Jr. et al. | |
| 5,909,217 A | 6/1999 | Bereiter | |
| 5,937,165 A | 8/1999 | Schwaller et al. | |
| 5,949,976 A | 9/1999 | Chappelle | |
| 5,978,594 A | 11/1999 | Bonnell et al. | |
| 6,021,437 A | 2/2000 | Chen et al. | |
| 6,041,347 A | 3/2000 | Harsham et al. | |
| 6,088,717 A | 7/2000 | Reed et al. | |
| 6,101,500 A | 8/2000 | Lau | |
| 6,128,016 A | 10/2000 | Coelho et al. | |
| 6,131,118 A | 10/2000 | Stupek, Jr. et al. | |
| 6,134,581 A | 10/2000 | Ismael et al. | |
| 6,138,122 A | 10/2000 | Smith et al. | |
| 6,148,335 A | 11/2000 | Haggard et al. | |
| 6,166,732 A | 12/2000 | Mitchell et al. | |
| 6,167,448 A | 12/2000 | Hemphill et al. | |
| 6,175,866 B1 | 1/2001 | Holloway et al. | |
| 6,175,878 B1 | 1/2001 | Seaman et al. | |
| 6,260,050 B1 | 7/2001 | Yost et al. | |
| 6,263,457 B1 | 7/2001 | Anderson et al. | |
| 6,272,150 B1 | 8/2001 | Hrastar et al. | |
| 6,336,138 B1 | 1/2002 | Caswell et al. | |
| 6,363,421 B2 | 3/2002 | Barker et al. | |
| 6,393,386 B1 | 5/2002 | Zager et al. | |
| 6,397,245 B1 | 5/2002 | Johnson, II et al. | |
| 6,434,626 B1 | 8/2002 | Prakash et al. | |
| 6,438,592 B1 | 8/2002 | Killian | |
| 6,456,306 B1 | 9/2002 | Chin et al. | |
| 6,466,932 B1 | 10/2002 | Dennis et al. | |
| 6,487,590 B1 | 11/2002 | Foley et al. | |
| 6,505,248 B1 | 1/2003 | Casper et al. | |
| 6,526,442 B1 | 2/2003 | Stupek, Jr. et al. | |
| 6,621,823 B1 | 9/2003 | Mellquist et al. | |
| 6,707,795 B1 | 3/2004 | Noorhosseini et al. | |
| 6,742,015 B1 | 5/2004 | Bowman-Amuah | |
| 6,763,380 B1 | 7/2004 | Mayton et al. | |
| 6,816,898 B1 | 11/2004 | Scarpelli et al. | |
| 6,836,888 B1* | 12/2004 | Basu ..................... | G06F 21/57 |
| | | | 718/100 |
| 6,895,586 B1 | 5/2005 | Brasher et al. | |
| 6,948,175 B1 | 9/2005 | Fong et al. | |
| 6,985,901 B1 | 1/2006 | Sachse et al. | |
| 7,003,564 B2 | 2/2006 | Greuel et al. | |
| 7,028,228 B1 | 4/2006 | Lovy et al. | |
| 7,043,537 B1 | 5/2006 | Pratt | |
| 7,043,661 B2 | 5/2006 | Valadarsky et al. | |
| 7,062,683 B2 | 6/2006 | Warpenburg et al. | |
| 7,096,459 B2 | 8/2006 | Keller et al. | |
| 7,146,574 B2 | 12/2006 | Goldthwaite et al. | |
| 7,197,466 B1 | 3/2007 | Peterson et al. | |
| 7,215,360 B2 | 5/2007 | Gupta | |
| 7,216,304 B1 | 5/2007 | Gourdol et al. | |
| 7,222,147 B1 | 5/2007 | Black et al. | |
| 7,281,170 B2 | 10/2007 | Taylor et al. | |
| 7,412,502 B2 | 8/2008 | Fearn et al. | |
| 7,505,872 B2 | 3/2009 | Keller et al. | |
| 7,593,013 B2 | 9/2009 | Agutter et al. | |
| 7,596,716 B2 | 9/2009 | Frost et al. | |
| 7,617,073 B2 | 11/2009 | Trinon et al. | |
| 7,660,731 B2 | 2/2010 | Chaddha et al. | |
| 7,676,294 B2 | 3/2010 | Baier et al. | |
| 7,676,437 B2 | 3/2010 | Satkunanathan et al. | |
| 7,840,490 B1 | 11/2010 | Sellers et al. | |
| 7,877,783 B1 | 1/2011 | Cline et al. | |
| 7,890,869 B1 | 2/2011 | Mayer et al. | |
| 7,966,398 B2 | 6/2011 | Wiles, Jr. | |
| 8,060,396 B1 | 11/2011 | Bessler et al. | |
| 8,196,210 B2 | 6/2012 | Sterin | |
| 8,321,948 B2 | 11/2012 | Robinson et al. | |
| 8,407,669 B2 | 3/2013 | Yee et al. | |
| 8,554,750 B2 | 10/2013 | Rangarajan et al. | |
| 8,595,647 B2 | 11/2013 | Sabin et al. | |
| 8,620,818 B2 | 12/2013 | Hughes et al. | |
| 8,646,093 B2 | 2/2014 | Myers et al. | |
| 8,674,992 B2 | 3/2014 | Poston et al. | |
| 8,725,647 B2 | 5/2014 | Disciascio et al. | |
| 9,053,460 B2 | 6/2015 | Gilbert et al. | |
| 9,098,555 B2 | 8/2015 | Bjork et al. | |
| 10,079,730 B2 | 9/2018 | Subramanian et al. | |
| 2002/0116340 A1 | 8/2002 | Hellberg et al. | |
| 2002/0133584 A1 | 9/2002 | Greuel et al. | |
| 2002/0158969 A1 | 10/2002 | Gupta | |
| 2003/0118087 A1 | 6/2003 | Goldthwaite et al. | |
| 2003/0200293 A1 | 10/2003 | Fearn et al. | |
| 2005/0015217 A1 | 1/2005 | Weidl et al. | |
| 2005/0091356 A1 | 4/2005 | Izzo | |
| 2006/0026453 A1 | 2/2006 | Frost et al. | |
| 2006/0095461 A1 | 5/2006 | Raymond | |
| 2006/0179058 A1 | 8/2006 | Bram et al. | |
| 2006/0293942 A1 | 12/2006 | Chaddha et al. | |
| 2007/0033279 A1 | 2/2007 | Battat et al. | |
| 2007/0188494 A1 | 8/2007 | Agutter et al. | |
| 2007/0288389 A1 | 12/2007 | Vaughan et al. | |
| 2008/0133289 A1 | 6/2008 | Armour et al. | |
| 2008/0148253 A1 | 6/2008 | Badwe et al. | |
| 2008/0319779 A1 | 12/2008 | Hughes et al. | |
| 2009/0088875 A1 | 4/2009 | Baier et al. | |
| 2009/0228984 A1 | 9/2009 | Sterin | |
| 2010/0110932 A1 | 5/2010 | Doran et al. | |
| 2012/0016706 A1 | 1/2012 | Pargaonkar et al. | |
| 2012/0239896 A1* | 9/2012 | Sobel .................... | G06F 3/0664 |
| | | | 711/E12.002 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

"Dm-crypt," Wikipedia, https://en.wikipedia.org/wifi/DM-crypt, printed from World Wide Web Oct. 29, 2020.
"Linux Unified Key Setup," Wikipedia, https://en.wikipedia.org/wiki/Linux_Unified_Key_Setup, printed from the World Wide Web Oct. 29, 2020.
"Sparse file," ArchWiki, https://wiki.archlinux.org/index.php/sparse_file, printed from the World Wide Web Nov. 2, 2020.
"Sparse file," Wikipedia, https://en.wikipedia.org/wiki/Sparse_file, printed from the World Wide Web Oct. 29, 2020.

* cited by examiner

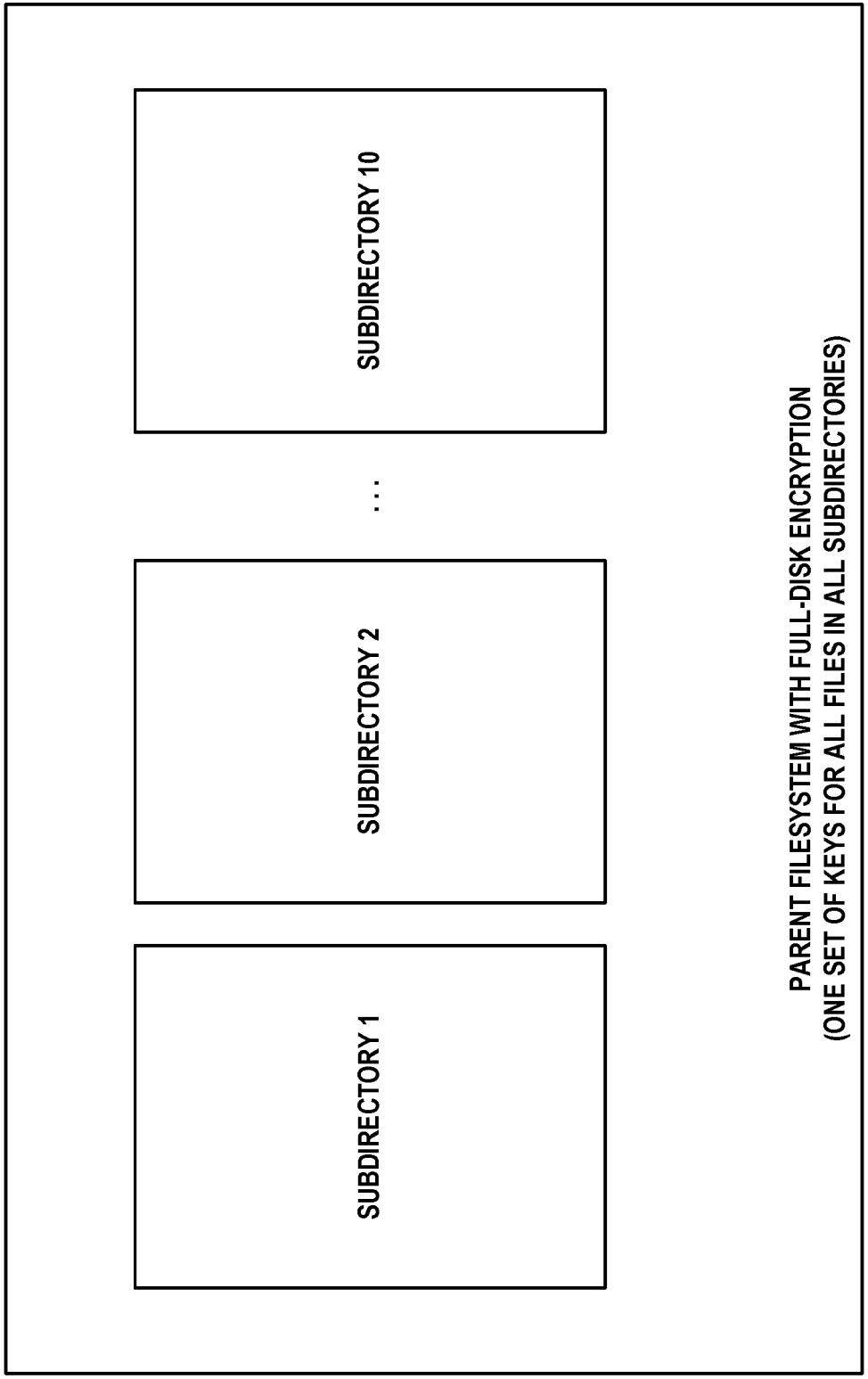

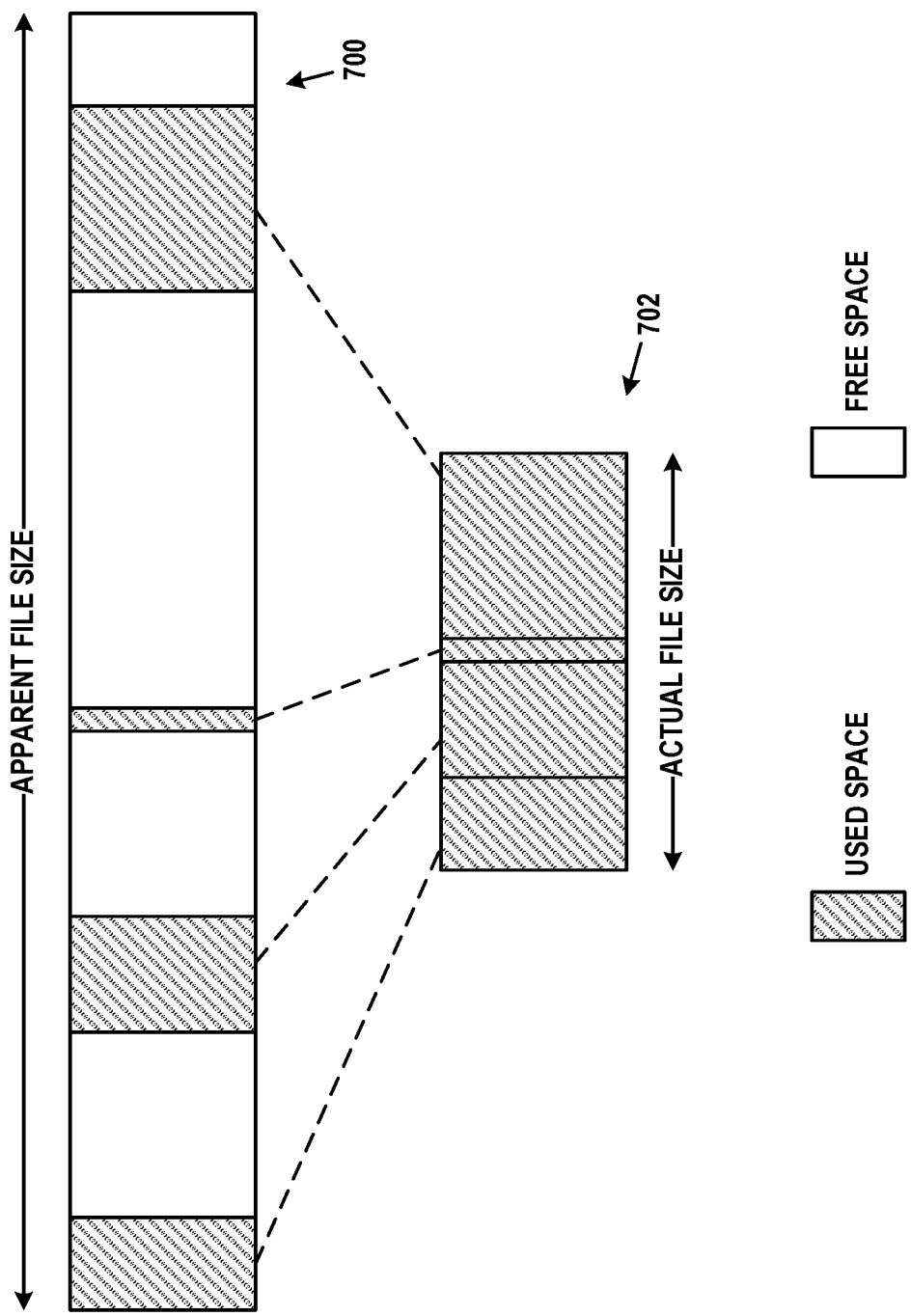

SECURITY FOR DATA AT REST IN A REMOTE NETWORK MANAGEMENT PLATFORM

BACKGROUND

Remote network management platforms allow multiple entities to share the computing resources of one or more computing devices. The entities each may have associated databases and files stored in dedicated parts of a parent filesystem on these computing devices. It is desirable to provide encryption for data at rest in these databases and files, but current techniques are limited to providing either: (i) application-specific encryption separately for each database and file, (ii) full-disk encryption for the entire filesystem, or (iii) generating a set of encrypted virtual filesystems, one for each entity, that are mounted to the parent filesystem. All of these techniques have significant drawbacks that prevent them from being practical or complete solutions in a multiple-entity environment.

Notably, application-specific encryption is not supported by all applications, and requires management of multiple keys when it is. Full-disk encryption requires that all entities share the same encryption keys, which reduces the security of data at rest for each entity. Use of encrypted virtual filesystems for each entity requires that the sizes of these filesystems be determined ahead of time. In practice, this results in highly-inefficient and inflexible use of disk space.

SUMMARY

The embodiments herein overcome these and possibly other technical problems by introducing a new filesystem architecture for a remote network management platform. Particularly, the data at rest for each entity are stored in respectively corresponding sparse files. Sparse files are defined to have an apparent size, but encode empty blocks with brief amounts of metadata rather than the actual null data that makes up the empty blocks. As a result, the actual sizes of sparse files can be much less than their apparent sizes. Thus, the sum of the apparent sizes of multiple sparse files can be greater than the amount of space on their physical storage medium.

Encryption keys are generated for each sparse file according to the requirements of the entity to which it is assigned, and a virtual mapped device is also created for each spares file. The sparse files are then formatted to contain respective encrypted virtual filesystems of the apparent size, where the encryption uses the corresponding keys and specified encryption parameters for each encrypted virtual filesystem. The encrypted virtual filesystems are mounted at respective mount points within the parent filesystem. In this way, applications serving a particular entity can read data from and write data to the entity's encrypted virtual filesystem using the configured keys and encryption parameters.

This solution addresses each of the aforementioned drawbacks. Application-specific encryption is not needed, because all data at rest in each encrypted virtual file system is encrypted and decrypted transparently to applications. Further, each encrypted virtual file system uses its own encryption keys that are controlled by its associated entity, so data stored in one such encrypted virtual file system cannot be read by any entity without the appropriate keys. Moreover, each of the sparse files containing the encrypted virtual file systems can be given an apparent size that spans a large extent or the entirety of the actual storage available for the data at rest for all entities. But, the actual sizes of these sparse files (and the encrypted virtual filesystems that they contain) can change dynamically based on storage utilization. Thus, storage space can be allocated in a much more efficient fashion.

Accordingly, a first example embodiment may involve persistent storage including one or more disks with a parent filesystem and a pre-configured amount of free space within the parent filesystem that is dedicated for shared use. The first example embodiment may also involve one or more processors configured to, for each of a plurality of child filesystems: create a sparse file with an apparent size equivalent to the pre-configured amount of free space, wherein the system is configured to maintain an actual size for the sparse file based on space used therein; create a virtual mapped device associated with the sparse file; establish one or more cryptographic keys for the virtual mapped device; create an encrypted virtual filesystem for the virtual mapped device and within the sparse file, wherein the encrypted virtual filesystem uses the cryptographic keys for application-transparent encryption and decryption of data stored by way of the encrypted virtual filesystem; and mount the encrypted virtual filesystem within the parent filesystem as one of the child filesystems.

A second example embodiment may involve persistent storage that includes one or more disks with a parent filesystem and a pre-configured amount of free space within the parent filesystem that is dedicated for shared use. The second example embodiment may also involve, for each of a plurality of child filesystems: creating a sparse file with an apparent size equivalent to the pre-configured amount of free space, wherein an actual size is maintained for the sparse file based on space used therein; creating a virtual mapped device associated with the sparse file; establishing one or more cryptographic keys for the virtual mapped device; creating an encrypted virtual filesystem for the virtual mapped device and within the sparse file, wherein the encrypted virtual filesystem uses the cryptographic keys for application-transparent encryption and decryption of data stored by way of the encrypted virtual filesystem; and mounting the encrypted virtual filesystem within the parent filesystem as one of the child filesystems.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed,

BRIEF DESCRIPTION OF THE DRAWINGS

FIG. 6B depicts another filesystem arrangement for a remote network management platform, in accordance with example embodiments.

FIG. 7 depicts a sparse file, in accordance with example embodiments.

DETAILED DESCRIPTION

Figure 1:
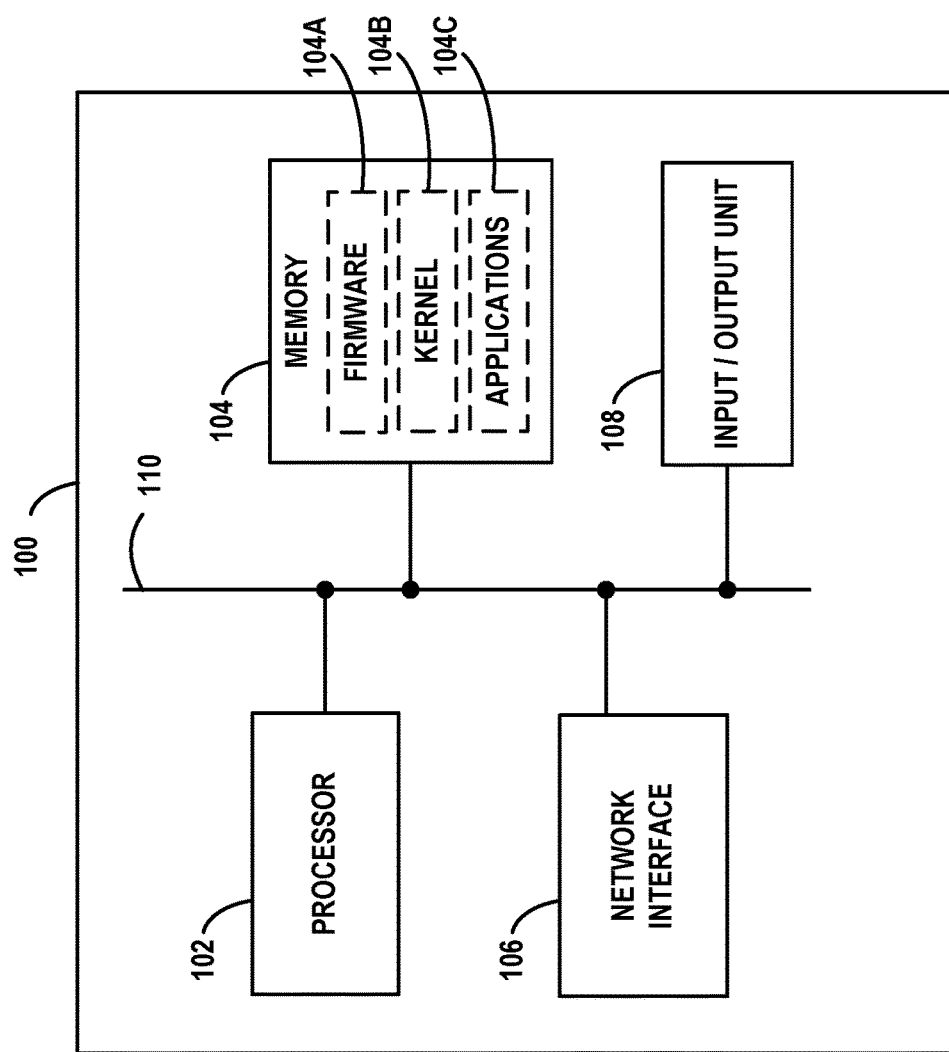
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more userspace software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
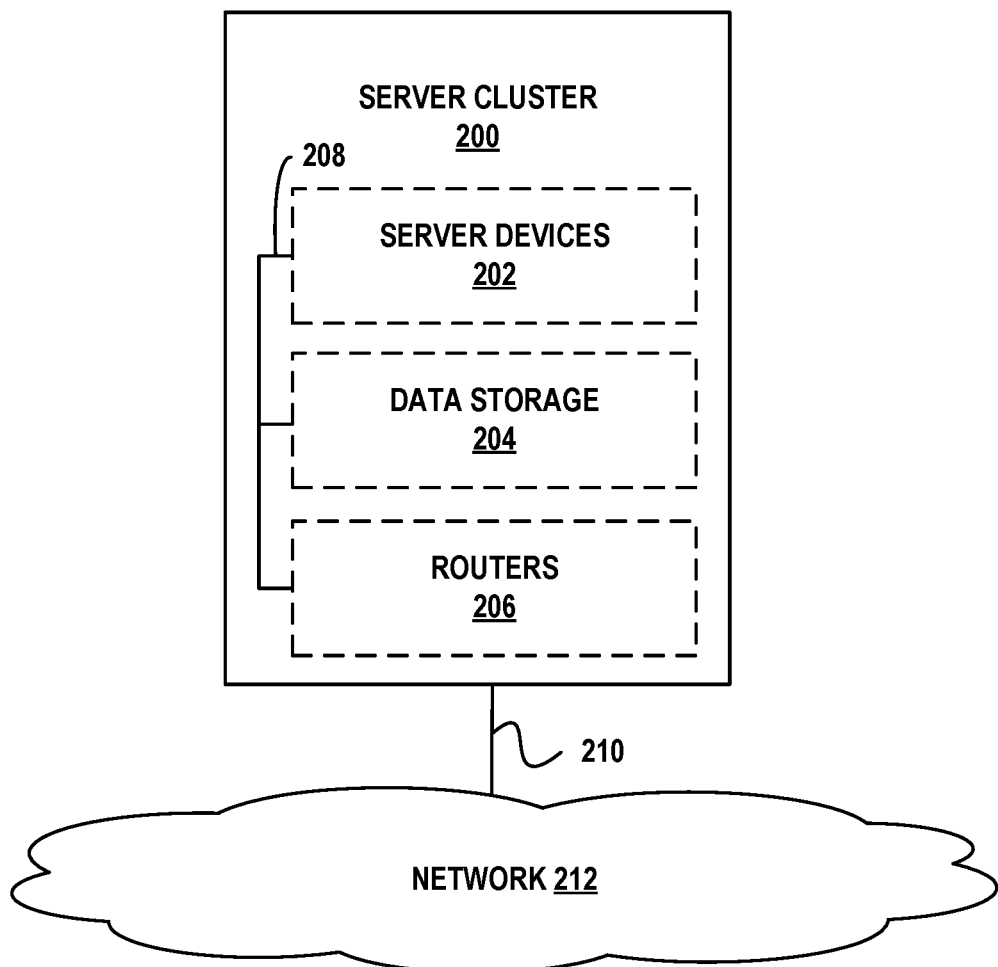
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
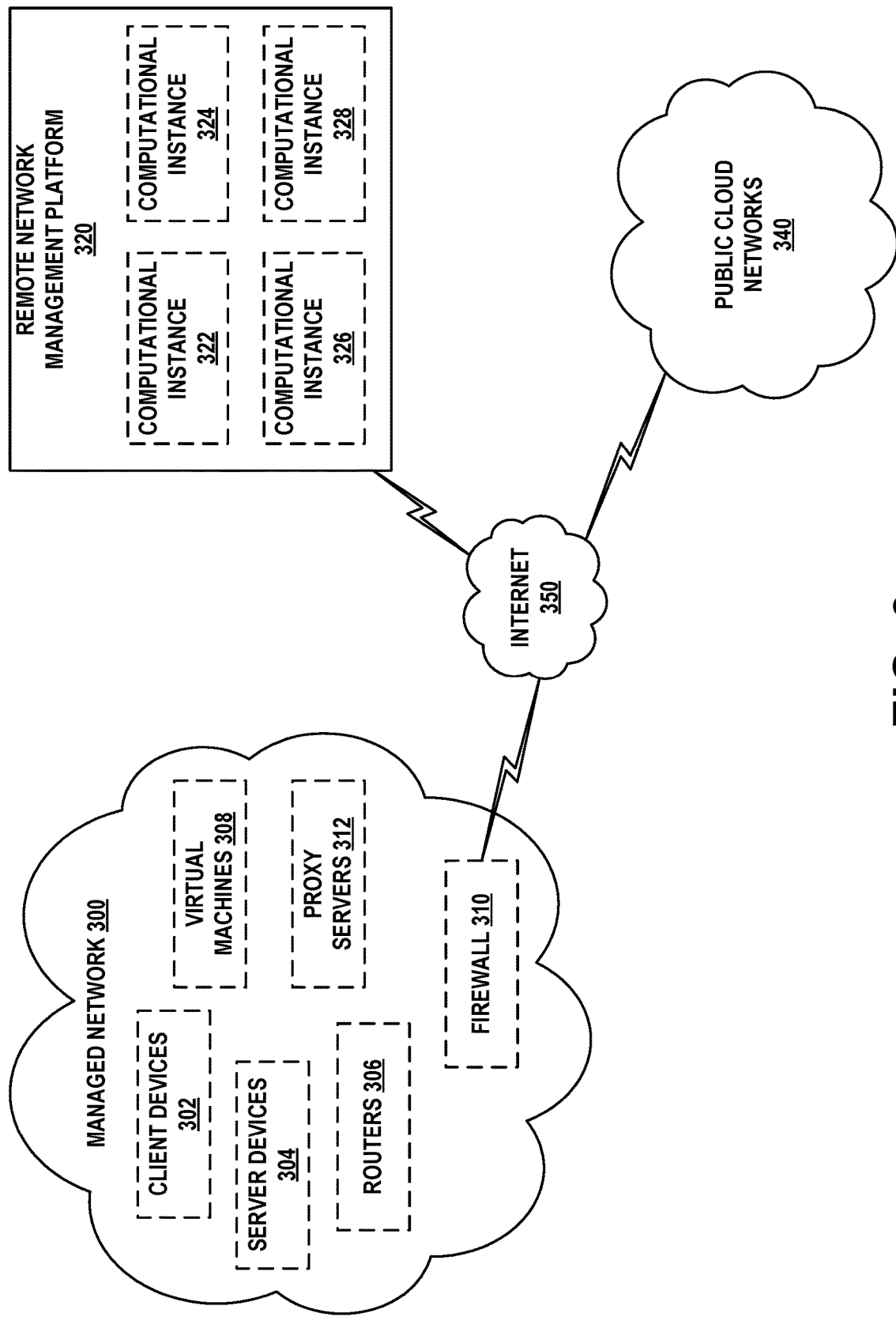
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
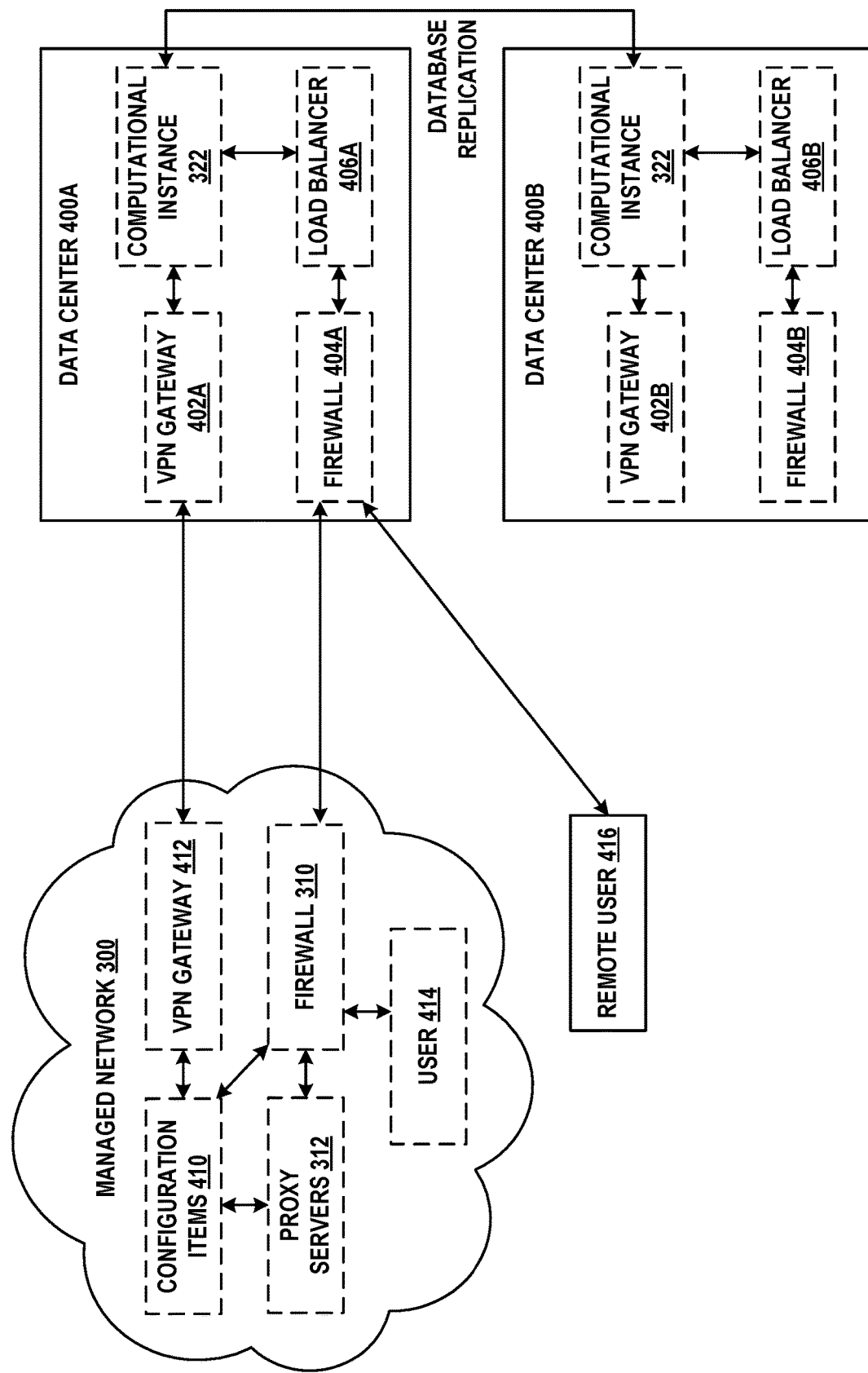
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
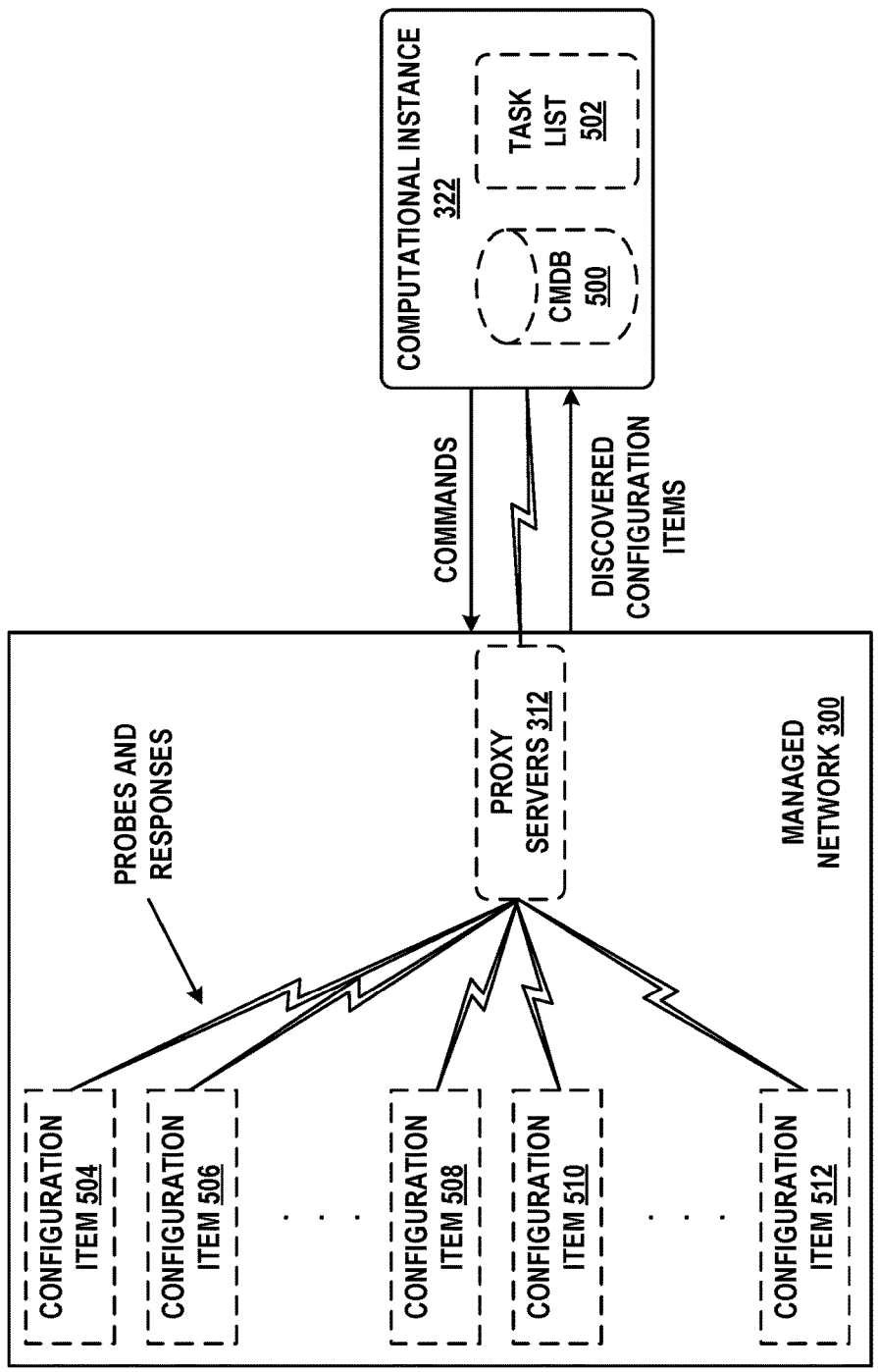
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
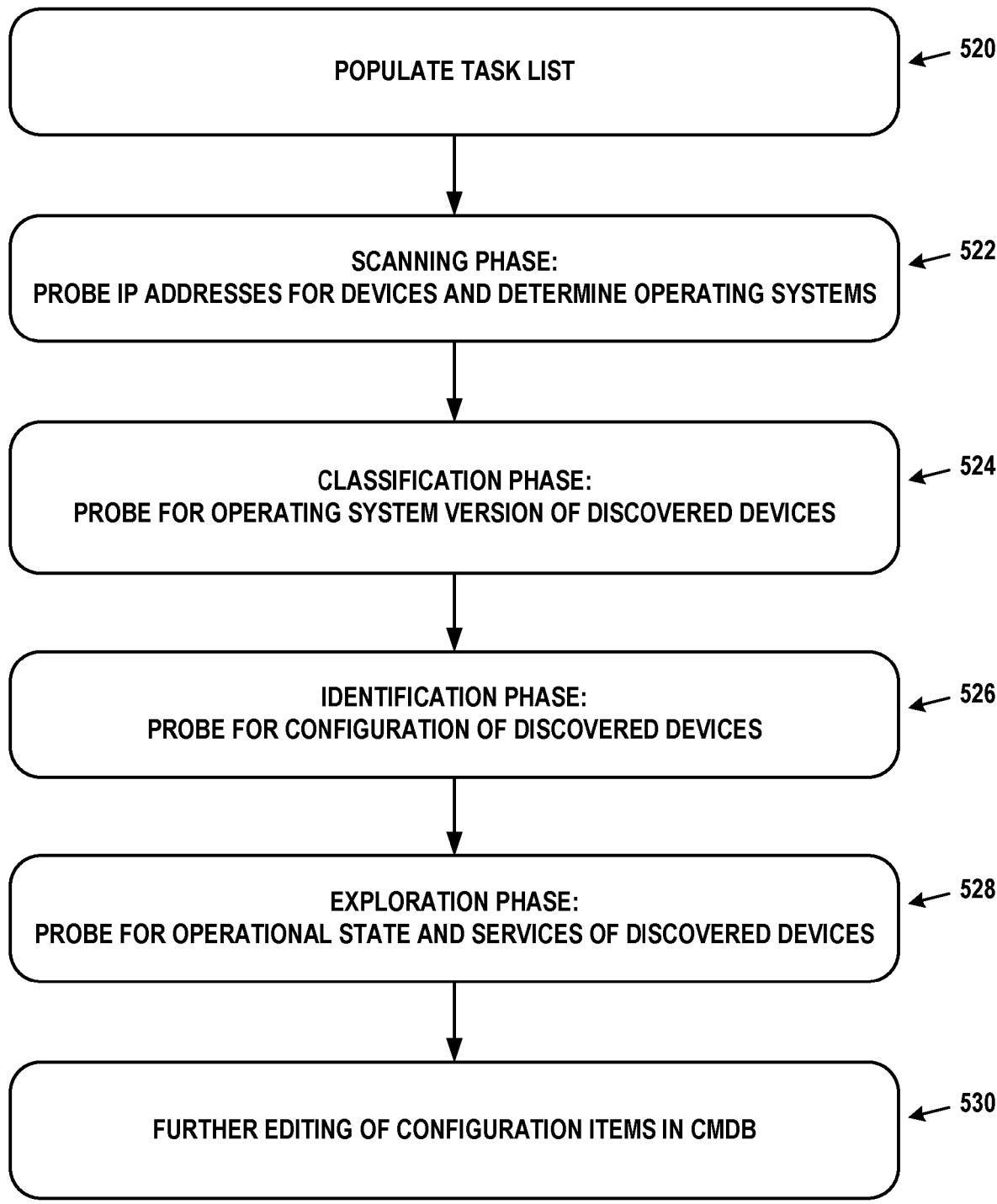
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Challenges with Encrypting Data at Rest

Data encryption in modern computing systems is becoming the norm rather than an optional feature. In particular, encryption of data at rest—data that is stored in any physical form—is now considered important in numerous industrial, commercial, governmental, and academic settings. While operating system security protects against unauthorized access to data at rest while a system is operational, data at rest on a system that is turned off can often be easily read or modified (e.g., by removing the physical storage medium and connecting it to another computer). Further, storage backups that do not encrypt data at rest open up another vector of attack.

Data at rest within a remote network management platform may contain sensitive information, such as personably identifiable information (PII) of individuals or proprietary information of enterprises. Thus, data security is a relevant concern because breaches thereof can be disastrous for individuals and organizations.

The remote network management platform described herein exhibits a number of challenges when attempting to adapt it to support encryption of data at rest. Notably, such a platform contains some number of computational instances sharing one or more application nodes and database nodes with one another. For example, a given application node/database node pair may consist of one or more physical computing devices, on which N computational instances are installed. Each computational instance may serve the needs of a different enterprise, and therefore these computational instances should be able to ensure that the data at rest of any one computational instance is not available to the others. The remote network management platform may include many of these application node/database node pairs across one or more datacenters.

In some embodiments, typical UNIX® filesystem permissions may be used for security. Each computational instance may be associated with an account on the underlying operating system. This account may have access to a dedicated set of subdirectories in which the account can write or read data in the form of files or further nested subdirectories. Thus, an account (and by extension, its associated computational instance) can only access files that are owned by the account (e.g., files in the dedicated set of subdirectories associated with the account), those that are globally accessible to any account on the operating system, or those that are accessible to a group in which the account is a member.

This arrangement largely prevents unauthorized access to data at rest by way of the operating system. But, as noted above, it does not protect data at rest when the physical computing devices are powered off. Nor does it protect backups of this data that are stored elsewhere (e.g., on a USB drive).

As a more concrete and simplified example, suppose that one physical computing device executing the LINUX® operating system includes both application node and database node functionality for 10 computational instances (while 10 computational instances are used in the following examples, this could be any number N>2). Each computational instance is dedicated to a different enterprise. Thus, each computational instance may be associated with a particular account, as well as a particular subdirectory tree that is part of a parent LINUX® filesystem. Each subdirectory contains data at rest for its associated account/computational instance/enterprise in the form of files. These files may be configuration files, log files, script files, and/or database files for instance. The files may be used by various remote network management platform applications executing on the physical computing device.

Figure 6A:
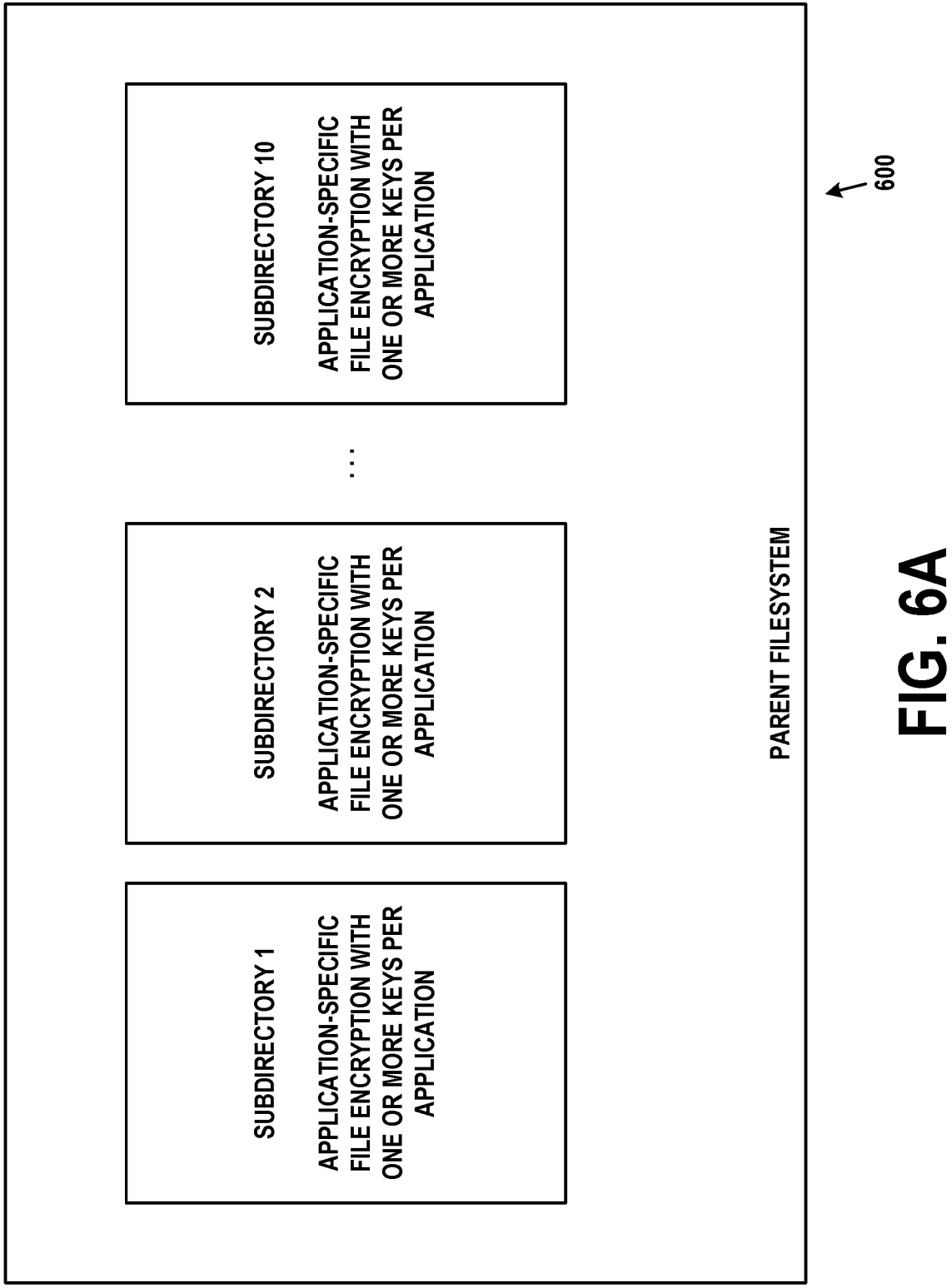
FIG. 6A depicts a filesystem arrangement for a remote network management platform, in accordance with example embodiments.

One way of securing some of the data at rest in such a system is shown in FIG. 6A. Arrangement 600 depicts a parent filesystem with 10 subdirectories, one dedicated to each computational instance. Each subdirectory may include further nested subdirectories. It is assumed that the parent filesystem spans one or more storage media (e.g., hard disk drives, solid state drives, etc.). Regardless, within the subdirectories, data at rest can be encrypted with application-specific techniques. For example, a database application that supports database encryption may encrypt one or more files that store the schema and/or at least some records of the database. This encryption might be applied on a per-table or per-column basis, for instance.

While doing so effectively secures the data at rest that is encrypted, arrangement 600 has numerous limitations and drawbacks. First, if the applications being used by the enterprise do not support their own encryption mechanisms, then their data might not be able to be encrypted. Second, each application may employ different encryption mechanisms, and not all of these mechanisms may be able to meet an enterprise's needs in terms of key length, robustness, support for a salt (random data added hashed passwords), and other parameters. Third, these disparities may effectively require the enterprise to maintain different cryptographic keys for each application that supports encryption, which becomes a security risk in itself. As a consequence, arrangement 600 is not a complete or scalable solution.

Another way of securing data at rest is shown in FIG. 6B. Arrangement 610 also depicts a parent filesystem with 10 subdirectories, one dedicated to each computational instance. Each subdirectory may include further nested subdirectories. In this arrangement, however, the entire parent filesystem (which is considered to include all of the subdirectories) is encrypted with full-disk encryption. Here, full-disk encryption (also referred to as whole-disk encryption) encrypts all blocks on the parent filesystem's storage media aside from the master boot record (MBR) or a similar area of a bootable disk. Full-disk encryption can be hardware-based and thus transparent to the operating system and the applications that execute on the operating system. Alternatively, full-disk encryption may be operating-system-based (e.g., in the kernel or a device driver) and thus transparent to the applications that execute on the operating system.

While full-disk encryption effectively secures all data at rest in arrangement 610, it is not without drawbacks. Particularly, full-disk encryption often uses the same key for encrypting all data at rest on the system. Thus, any data at rest can be decrypted from the storage media if the key is known. This may violate security requirements for certain enterprises or government entities. Therefore, application-specific encryption (and its aforementioned disadvantages) may still be needed. Additionally, full disk encryption may result in a modest, yet tangible, decrease in read/write performance for the storage media, as more computation is required for these activities.

Also, some enterprises may have specific key-length or encryption algorithm requirements that are incompatible with one another. For example, one enterprise may require its data at rest to be encrypted with AES-128 (the Advanced Encryption Standard with a 128-bit key) while another enterprise may require its data at rest to be encrypted with ChaCha20 (an alternative to AES that uses a 256-bit key). Both of these enterprises cannot have computational instance data on the same disk with full-disk encryption due to their disparate requirements.

Figure 6C:
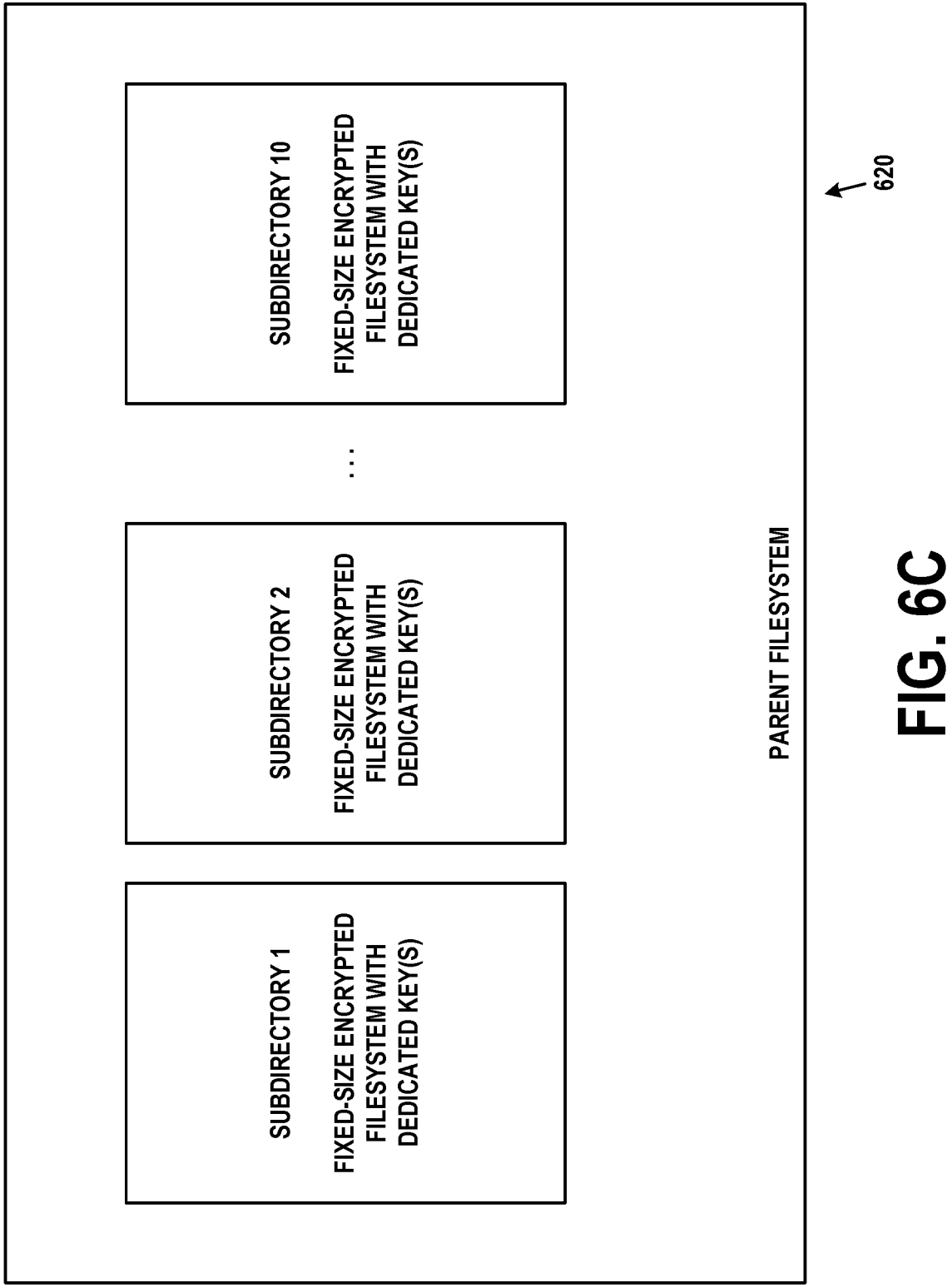
FIG. 6C depicts yet another filesystem arrangement for a remote network management platform, in accordance with example embodiments.

Yet another way of securing data at rest is shown in FIG. 6C. Arrangement 620 also depicts a parent filesystem with 10 subdirectories, one dedicated to each computational instance. Each subdirectory may include further nested subdirectories. In this arrangement, though, each subdirectory is mounted to the parent filesystem as a separate and dedicated encrypted virtual filesystem. For example, each filesystem may be a separate disk partition that is encrypted separately using full-disk encryption.

In this manner, each subdirectory may have its own encryption keys to protect data at rest, and may operate transparently to applications. This solves some of the problems described above. However, arrangement 620 suffers from additional limitations. Particularly, disk partitions are of predetermined fixed sizes. Thus, storage from must be allocated to each partition (and thus to each corresponding enterprise) ahead of time. As a consequence, the overall storage space in arrangement 620 cannot be flexibly managed.

As an example, suppose that the underlying storage for subdirectories 1-10 is 20 gigabytes. Suppose further than each of the 10 partitions (one for each subdirectory) is allocated 2 gigabytes of this storage. Such an allocation works fine until one or more subdirectories approach their 2 gigabyte limit. In particular, assume that the partition for subdirectory 2 is 100% full, but all other partitions are no more than 50% full. Thus, there is a total of at least 9 gigabytes of free space across all partitions. But none of this free space can be used for subdirectory 2 without reformatting two or more of the partitions. Doing so is undesirable, because it would involve taking the entire system out of service for maintenance.

Even worse, consider the scenario in which the subdirectories of all 10 partitions are using no more than 20% of their storage space (i.e., up to 400 megabytes each). In this case, the vast majority of the available storage (16 gigabytes) sits unused. Ideally, more subdirectories could be added to arrangement 620 to support more enterprises on the same system. But again, none of this free space can be reallocated without reformatting at least some of the partitions.

As a consequence, arrangement 620 has two significant drawbacks. First, storage space is allocated in a fixed and inflexible fashion. Second, storage space cannot be reallocated without significant manual effort and service interruption. Thus, none of arrangements 600, 610, or 620 provide the requisite security functionality in a workable fashion.

VI. Encrypted Filesystems with Sparse Files

The embodiments herein overcome the aforementioned drawbacks by using sparse files formatted to contain respective encrypted virtual filesystems. Sparse files are defined to have an apparent size, but encode empty blocks with brief amounts of metadata rather than the actual null data that makes up empty blocks. As a result, the actual sizes of sparse files can be much less than their apparent sizes.

This is shown in FIG. 7. Sparse file 700 consists of used and free blocks, with significantly more of the latter. The total combined size of these used and free blocks is the apparently file size. But the actual file size is depicted in representation 702 as just the logical concatenation of the used blocks.

The sum of the apparent sizes of multiple sparse files can be greater than the amount of space on their physical storage medium. As an example, suppose that there is storage media (e.g., one or more hard disks or solid state drives) with a total of size of 20 gigabytes. A sparse file can be created on this storage media with an apparent size of up to 20 gigabytes. Suppose further that this sparse file has an apparent size of 20 gigabytes and 1 gigabyte of data is written to it. While the apparent size remains at 20 gigabytes, its actual size may be about 1.1 gigabytes (the additional 0.1 gigabytes may be metadata or overhead to keep track of the utilization of the sparse file).

Moreover, multiple sparse files can be created with a total apparent size that exceeds that of the storage media. Keeping with the same example, a second sparse file may be created on the same storage media also with an apparent size of 20 gigabytes. Even though the sum of the apparent sizes of these sparse files is 40 gigabytes (which exceeds the 20 gigabyte capacity of the storage media), as long as the actual sizes of the sparse files are no more than 20 gigabytes, the files can coexist.

Put another way, the size of the storage media constrains the apparent size of each sparse file, but not the sum of the apparent sizes of multiple sparse files. But the size of the storage media constrains the sum of the actual sizes of the multiple sparse files. Thus, each sparse file can grow in a flexible fashion and efficiently share storage space with other sparse and non-sparse files.

Various filesystem tools may be aware of sparse files and thus also able to create and manipulate sparse files, as well as to report their apparent and/or actual sizes, accordingly. For instance, the UNIX® dd command can be used to create a 20-gigabyte sparse file file.img with block sizes of 1 kilobytes by writing null bytes (0x00) from virtual device/ dev/zero as follows:

dd if=/dev/zero of=file.img bs=1k seek=20480k count=0

In some variations of UNIX®, the du command reports the actual size of a sparse file, while the ls command reports the apparent size of a sparse file. Like files in general, sparse files can be copied (either to a non-sparse file or another sparse file).

The characteristics of sparse files are desirable in the context of supporting multiple computational instances that may require varying amounts of storage. Notably, sparse files can grow and shrink with use and multiple sparse files can be used to share an entire filesystem. But computational instances store data in filesystems (or subdirectories of a filesystem), and as discussed above often desire that this data be encrypted. Thus, sparse files alone are insufficient for these purposes.

Nonetheless, sparse files can be combined with other features, including full-disk encryption and virtual filesystems, to be able to address these deficiencies.

Modern UNIX® variations of full-disk encryption involve kernel support for a cryptography application processing interface (API) that supports system calls from application space. In particular, these capabilities may be based on a device mapper architecture that maps virtual block devices to other virtual or physical block devices. Each mapping may be associated with a transformation (e.g., encryption or decryption). This, at least in these embodiments, full-disk encryption uses a virtual filesystem built atop a virtual block device to operate. The sparse file can be defined as a virtual block device. Then, an encrypted virtual filesystem can be formatted the virtual block device. In this fashion, the virtual filesystem is encrypted and stored within the sparse file.

Figure 8:
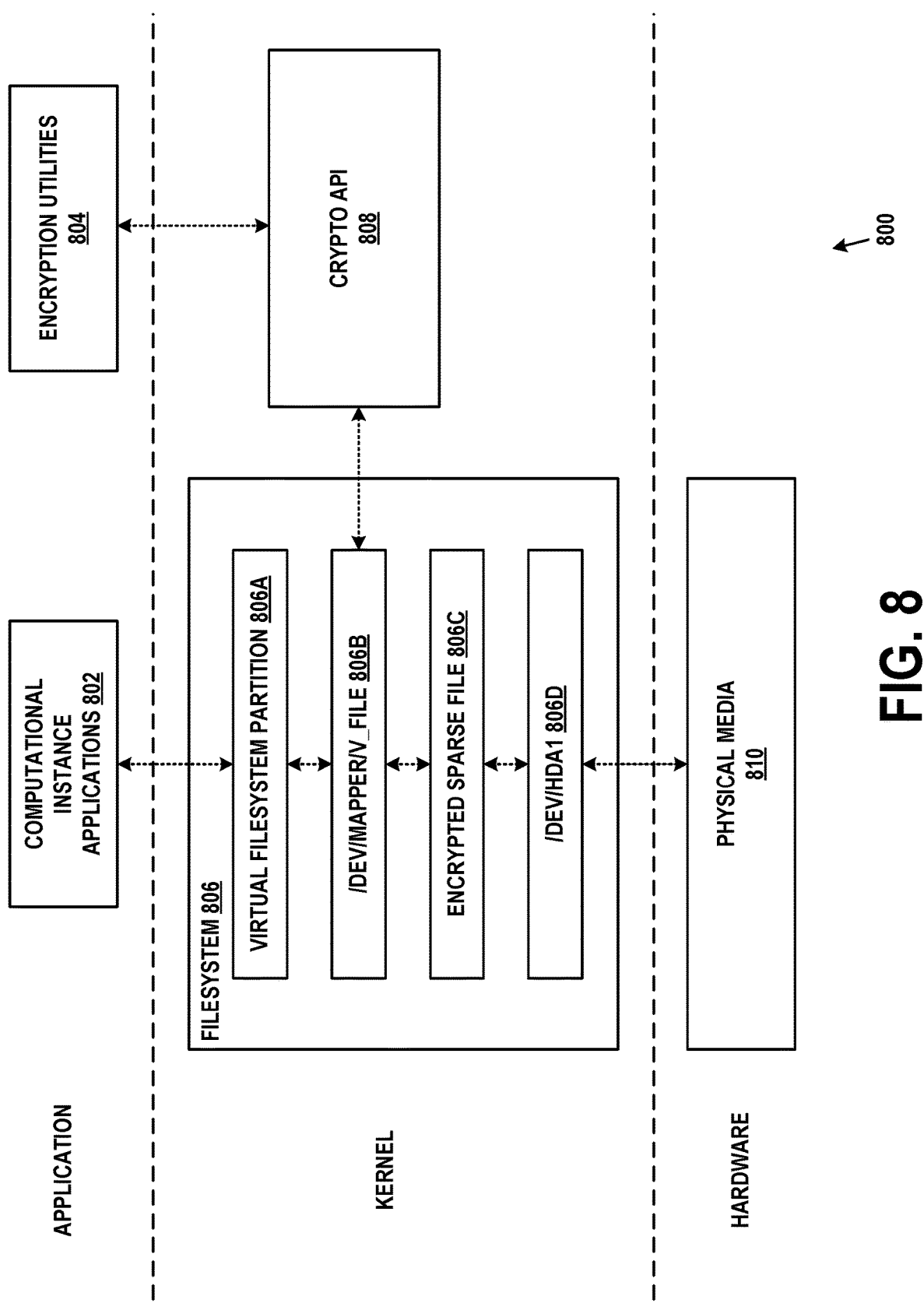
FIG. 8 depicts an architecture for supporting encrypted filesystems contained within a sparse file, in accordance with example embodiments.

FIG. 8 depicts architecture 800 as an example embodiment. Architecture 800 includes an application space and a kernel space in software, as well as hardware.

The application space includes computational instance applications 802 and encryption utilities 804. Computational instance applications 802 may include any applications used by a computational instance, such as IT, HR, CRM, customer service, application development, machine learning, and security applications. Encryption utilities may be application space programs that interface with cryptography module(s) in the kernel space.

The hardware may include physical media 810. Physical media 810 may comprise one or more storage devices on which filesystem 806 resides across one or more partitions.

The kernel space includes filesystem 806 and the crypto API 808. While filesystem 806 is not physically part of the kernel, the kernel does control and mediate access to filesystem 806 by way of various filesystem APIs. Thus, filesystem 806 may be considered to be logically part of the kernel. Filesystem 806 may include a number of components, including virtual filesystem partition 806A, mapped device 806B (here, named /dev/mapper/v_file), encrypted sparse file 806C, and device 806D (here, named /dev/hda1). Working backwards through these components, device 806D represents a partition on physical media 810 to the kernel space and application space. Encrypted sparse file 806C may be a sparse file as described above stored on device 806D, and may be effectively encrypted. Mapped device 806B may be a virtual block device mapped onto encrypted sparse file 806C and configured for encryption by way of crypto API 808. Virtual filesystem partition 806A may, in turn, be mapped onto mapped device 806B.

Notably, mapped device 806B and device 806D may both reside in a /dev filesystem, which uses files (sometimes called device files) to represent virtual and physical devices. These files can be read from or written to in order to access the associated virtual or physical device.

Crypto API 808 may be a kernel module that supports encryption and decryption of data in block devices. It can be configured by way of encryption utilities 804. For example, encryption utilities may specify one or more cryptographic keys and/or cryptographic algorithms to use when encrypting and decrypting data between computational instance applications 802 and physical media 810.

Architecture 800 results in an encrypted filesystem, where data written to virtual filesystem partition 806A are encrypted by way of crypto API 808 and stored in encrypted sparse file 806C. Conversely, data read from virtual filesystem partition 806A are retrieved from encrypted sparse file 806C and decrypted by way of crypto API 808.

Encrypted sparse file 806C has the characteristics of a sparse file, in that it can have an actual size that is smaller than its apparent size. Thus, the amount of space on physical media 810 taken up by encrypted sparse file 806C will only be the space needed for files written to virtual filesystem partition 806A by computational instance applications 802.

Although encrypted sparse file 806C is referred to as being encrypted, it may be more accurate to state that the data written to encrypted sparse file 806C is encrypted. Thus, encrypted sparse file 806C could also just be referred to as a sparse file. Likewise, virtual filesystem partition 806A is not referred to as being encrypted, but it effectively is encrypted. Thus, virtual filesystem partition 806A may be referred to as an encrypted virtual filesystem or an encrypted virtual partition.

Writes to encrypted sparse file 806C may occur as follows. One of computational instance applications 802 provides data to the kernel for writing to a file (existing or new) within virtual filesystem partition 806A. This file may store configuration information, log information, a script, part or all of a database, or other information. The data is routed by the kernel through crypto API 808 by way of mapped device 806B and is thereby encrypted. The encrypted data is then written from mapped device 806B to the appropriate location in encrypted sparse file 806C. The written encrypted data may change the actual size (but not the apparent size) of encrypted sparse file 806C. As encrypted sparse file 806C is mapped to device 806D, the encrypted data may be stored in physical media 810.

Reads from encrypted sparse file 806C may occur as follows. One of computational instance applications 802 provides a request to the kernel for reading from a file within virtual filesystem partition 806A. The request is passed through mapped device 806B, encrypted sparse file 806C, and device 806D to locate the requested data on physical media 810. This data (which is encrypted) is passed back through device 806D, and associated with the appropriate location in encrypted sparse file 806C. The data is then decrypted with the help of crypto API 808 by routing it through mapped device 806B. Once mapped to virtual filesystem partition 806A, the unencrypted data is provided in response to the read request.

While the above descriptions of writing to and reading from encrypted sparse file 806C imply that data is moving through the kernel, in practice, the data may be written to a single buffer. Operations by various kernel modules may occur on that buffer, without the data itself being moved, aside from it being encrypted or decrypted. This makes reads and writes more efficient by reducing the number of times read or written data is copied or modified within the kernel.

Architecture 800 can be created by executing a series of UNIX® commands, for example on a LINUX® system. As noted above, a sparse file can be created using the dd command by writing null bytes (0x00) from virtual device /dev/zero as follows:

dd if=/dev/zero of=file.img bs=1k seek=20480k count=0

The sparse file file.img may be located in a particular partition of a physical or virtual filesystem, which may be referred to herein as a "parent" filesystem. A mapped device /dev/mapper/v_file may be initiated for the sparse file using the cryptsetup encryption utility as follows:

cryptsetup open file.img v_file

Encryption keys may be set up for the mapped device by using cryptsetup encryption utility as follows:

cryptsetup luksFormat/dev/mapper/v_file

This command can also be given parameters to determine the type of encryption used (e.g., algorithm and key length) and/or a key file containing cryptographic keys to use for this mapped device. A child filesystem partition may be written to the mapped device (and thus to the sparse file as follows:

mkfs.ext4/dev/mapper/v_file

Further, the sparse file (which now contains an encrypted child filesystem) can be mounted to any available mount point in the parent filesystem (here the /usr/customer directory) as follows:

mkdir/usr/customer; mount -o loop file.img

Due to the vast number of LINUX® (and UNIX®) variations, some embodiments may involve executing these commands in a different order and/or with different parameters. In some cases, intervening commands not shown here are used. Further, any of these commands may eventually be replaced with other commands that provide similar functionality. Thus, the commands and the ordering thereof is shown for purposes of example and should not be considered limiting.

In any event, the commands above establish one encrypted sparse file containing a filesystem. In a remote network management platform, such a sparse file may be established for each computational instance. For example, if there are 10 computational instances sharing a system, 10 different encrypted sparse files containing 10 different filesystems may be established.

Figure 9:
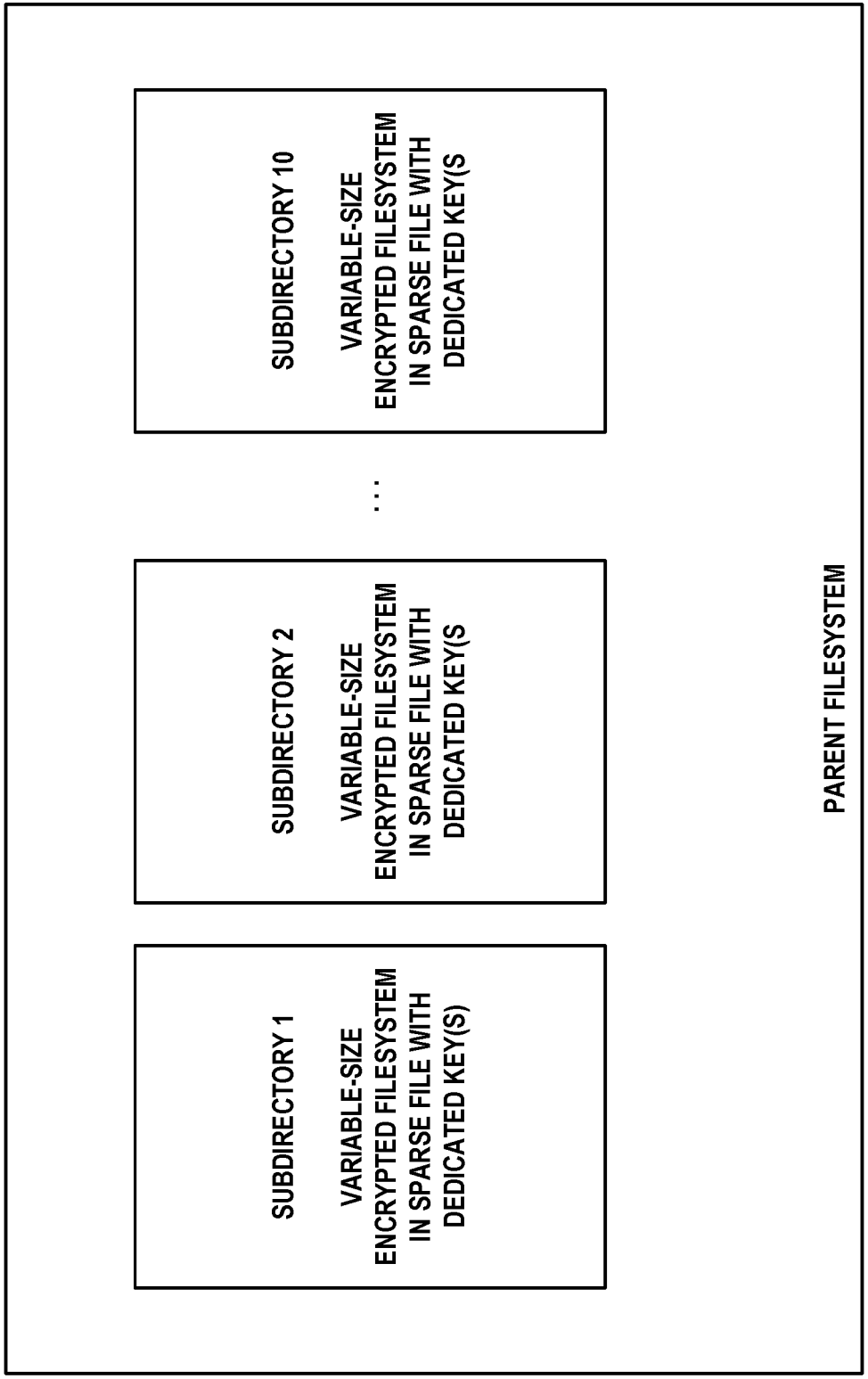
FIG. 9 depicts a further filesystem arrangement for a remote network management platform, in accordance with example embodiments

To that point, FIG. 9 depicts arrangement 900. Similar to arrangements 600, 610, and 620, arrangement 900 includes a parent filesystem with 10 subdirectories, one dedicated to each computational instance. Each subdirectory may include further nested subdirectories. In accordance with architecture 800, each subdirectory is implemented as an encrypted virtual filesystem within or atop a sparse file.

Arrangement 900 overcomes all of the limitations inherent in arrangements 600, 610, and 620. While application-specific encryption can be used, it is not required because all data in each sparse file is encrypted. The encryption employed for each sparse file can use different cryptographic keys and can be tailored to the associated enterprise's needs in terms of key length, robustness, support for a salt, and other parameters. Moreover, since the actual sizes of sparse files are based on their utilizations, the encrypted filesystems thereon can grow and shrink with use by the corresponding computational instance. Thus, the sparse files can have a total apparent size that exceeds the amount of storage available, while the storage is allocated arbitrarily amongst these sparse files.

For example, suppose that the storage media has a total available size of 20 gigabytes. For arrangement 900, each of the 10 computational instances can be allocated a sparse file on this storage media with an apparent size of 20 gigabytes. So long as the total of the actual sizes of these sparse files is no more than 20 gigabytes, all of these sparse files (and their corresponding encrypted virtual filesystems) can coexist within the storage media.

In this manner, security is increased by giving each computational access control over its own cryptographic keys and parameters. Moreover, storage utilization is decreased and otherwise made more efficient by not requiring the pre-allocation of dedicated portions of the storage media to particular computational instances.

To the extent that the sum of the actual utilization across all sparse files exceeds a pre-determined threshold (e.g., a high watermark such as 80% or 90%), the system may provide an alert or notification to an administrator. The administrator may determine whether to add more storage to the system or to migrate one or more computational instances to another system with more storage.

VII. Example Operations

Figure 10:
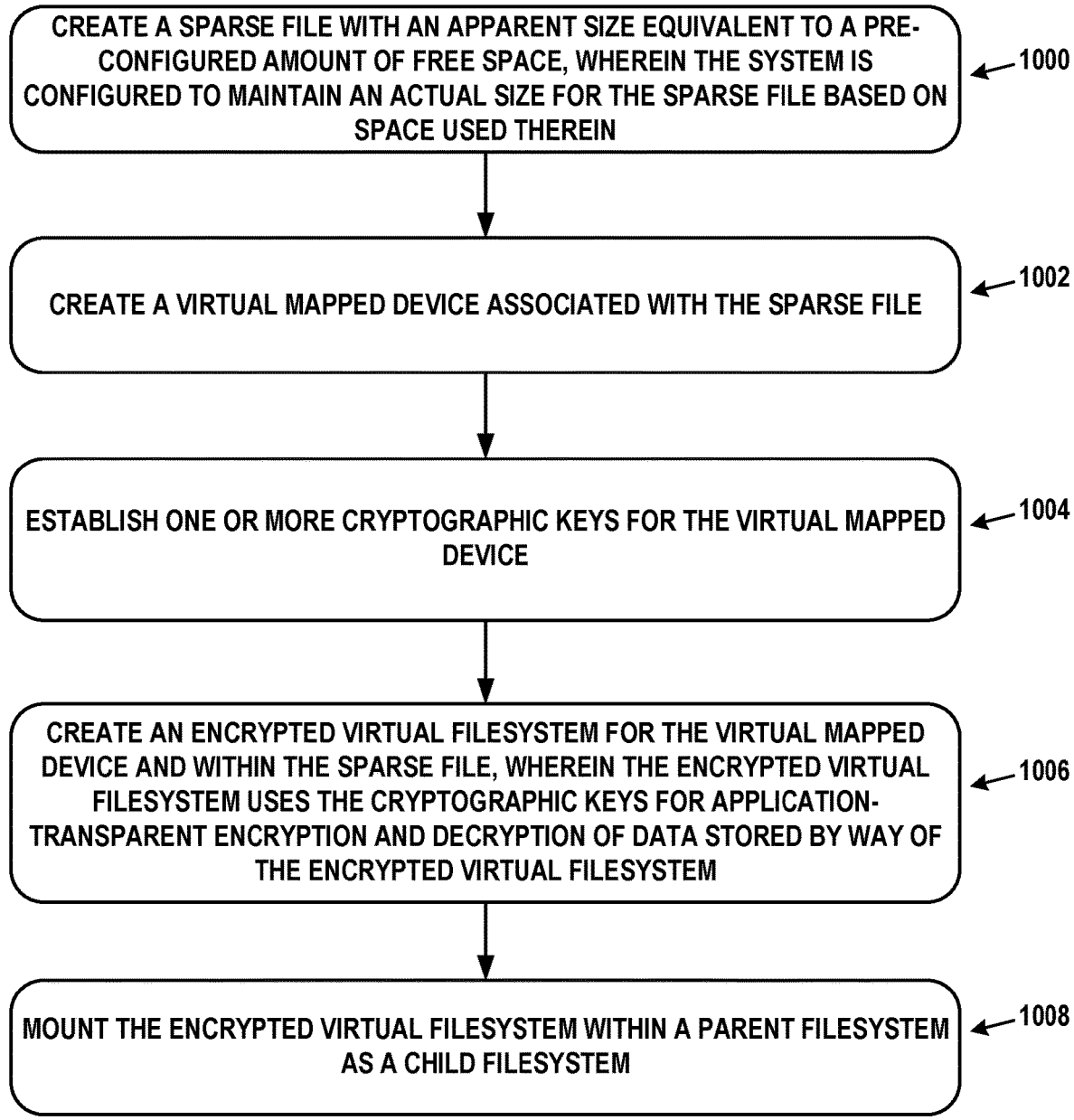
FIG. 10 is a flow chart, in accordance with example embodiments.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a computational instance of a remote network management platform or a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

These embodiments may involve persistent storage that includes one or more disks with a parent filesystem. There may be a pre-configured amount of free space within the parent filesystem that is dedicated for shared use. The operations of blocks 1000-1008 may be carried out for each of a plurality of child filesystems.

Block 1000 may involve creating a sparse file with an apparent size equivalent to the pre-configured amount of free space, wherein an actual size is maintained for the sparse file based on space used therein.

Block 1002 may involve creating a virtual mapped device associated with the sparse file.

Block 1004 may involve establishing one or more cryptographic keys for the virtual mapped device.

Block 1006 may involve creating an encrypted virtual filesystem for the virtual mapped device and within the sparse file, wherein the encrypted virtual filesystem uses the cryptographic keys for application-transparent encryption and decryption of data stored by way of the encrypted virtual filesystem.

Block 1008 may involve mounting the encrypted virtual filesystem within the parent filesystem as one of the child filesystems.

In some embodiments, the pre-configured amount of free space is a total amount of storage space provided by at least one of the one or more disks.

In some embodiments, the pre-configured amount of free space is less than a total amount of storage space provided by the one or more disks.

In some embodiments, the encrypted virtual filesystem is referenced by the system as a virtual disk partition.

In some embodiments, the cryptographic keys are different for each sparse file in the system.

In some embodiments, the one or more disks include a hard disk drive or a solid state drive.

In some embodiments, the actual size of the sparse file grows with new data written to the encrypted virtual filesystem and shrinks when data is deleted from the encrypted virtual filesystem.

Some embodiments may further involve: monitoring a sum of the actual sizes of all sparse files in the parent filesystem; determining when the sum exceeds a utilization threshold; and providing an alert indicating that the system is subject to high utilization.

Some embodiments may further involve: obtaining data, from an application, to write to a first location in the encrypted virtual filesystem; encrypting the data using the cryptographic keys; determining, by way of the virtual mapped device, a second location within the sparse file that is associated with the first location; and storing the data as encrypted in the second location within the sparse file, wherein storing the data modifies the actual size of the sparse file but not the apparent size of the sparse file.

Some embodiments may further involve: obtaining, from an application, a request to read data from a first location in the encrypted virtual filesystem; determining, by way of the virtual mapped device, a second location within the sparse file that is associated with the first location; reading the data from the second location within the sparse file; decrypting the data using the cryptographic keys; and providing, to the application, the data as decrypted.

VIII. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
    persistent storage including one or more disks providing a parent filesystem with a pre-configured amount of free space; and
    one or more processors configured to:
        create, within the pre-configured amount of free space, N sparse files, each with an apparent size equivalent to the pre-configured amount of free space and an actual size based on space used by the respective sparse file, wherein a sum of the apparent sizes of the N sparse files is greater than the pre-configured amount of free space, where N is at least 2;
        create N virtual devices, one for each of the N sparse files;
        establish N sets of cryptographic keys, one set for each of the N virtual devices;
        create N encrypted virtual filesystems, one for each of the N virtual devices and one within each of the N sparse files; and
        mount the N encrypted virtual filesystems within the parent filesystem as N child filesystems, wherein each of the N child filesystems uses N sets of cryptographic keys for application-transparent encrypted data storage.

2. The system of claim 1, wherein the pre-configured amount of free space is a total amount of storage space provided by at least one of the one or more disks.

3. The system of claim 1, wherein the pre-configured amount of free space is less than a total amount of storage space provided by the one or more disks.

4. The system of claim 1, wherein the N encrypted virtual filesystems are referenced by the system as respective virtual disk partitions.

5. The system of claim 1, wherein the N sets of cryptographic keys are different from one another.

6. The system of claim 1, wherein the one or more disks include a hard disk drive or a solid state drive.

7. The system of claim 1, wherein the actual sizes of the N sparse files grow with new data written to their associated encrypted virtual filesystems and shrink when data is deleted from their associated encrypted virtual filesystem.

8. The system of claim 1, wherein the one or more processors are further configured to:
    monitor a sum of the actual sizes of the N sparse files in the parent filesystem;
    determine when the sum exceeds a utilization threshold; and
    provide an alert indicating that the system is subject to high utilization.

9. The system of claim 1, wherein the one or more processors are further configured to:
    obtain data, from an application, to write to a first location in an encrypted virtual filesystem of the N encrypted virtual filesystems;
    encrypt the data using a set of cryptographic keys associated with the encrypted virtual filesystem;
    determine, by way of a virtual device associated with the set of cryptographic keys, a second location within a sparse file associated with the virtual device, wherein the second location is associated with the first location; and
    store the data as encrypted in the second location within the sparse file, wherein storing the data modifies the actual size of the sparse file but not the apparent size of the sparse file.

10. The system of claim 1, wherein the one or more processors are further configured to:
    obtain, from an application, a request to read data from a first location in an encrypted virtual filesystem of the N encrypted virtual filesystems;
    determine, by way of a virtual device associated with the encrypted virtual filesystem, a second location within sparse file associated with the virtual device, wherein the second location is associated with the first location;
    read the data from the second location within the sparse file;
    decrypt the data using a set of cryptographic keys associated with the virtual device; and
    provide, to the application, the data as decrypted.

11. A computer-implemented method, wherein persistent storage includes one or more disks providing a parent filesystem with a pre-configured amount of free space, and wherein the method comprises:
    creating, within the pre-configured amount of free space N sparse files, each with an apparent size equivalent to the pre-configured amount of free space and an actual size based on space used by sparse file, wherein a sum of the apparent sizes of the N sparse files is greater than the pre-configured amount of free space, where N is at least 2;
    creating N virtual devices, one for each of the N sparse files;
    establishing N sets of cryptographic keys, one set for each of the N virtual devices;
    creating N encrypted virtual filesystems, one for each of the N virtual devices and one within each of the N sparse files; and
    mounting the N encrypted virtual filesystems within the parent filesystem as one of N child filesystems, wherein each of the N child filesystems uses one of the N sets of cryptographic keys for application-transparent encrypted data storage.

12. The computer-implemented method of claim 11, wherein the N encrypted virtual filesystems are referenced as respective virtual disk partitions.

13. The computer-implemented method of claim 11, wherein the N sets of cryptographic keys are different from one another.

14. The computer-implemented method of claim 11, wherein the actual sizes of the N sparse files grow with new data written to their associated encrypted virtual filesystems and shrink when data is deleted from their associated encrypted virtual filesystem.

15. The computer-implemented method of claim 11, further comprising:
    monitoring a sum of the actual sizes of the N sparse files in the parent filesystem;
    determining when the sum exceeds a utilization threshold; and
    providing an alert indicating that the parent filesystem is subject to high utilization.

16. The computer-implemented method of claim 11, further comprising:

obtaining data, from an application, to write to a first location in an encrypted virtual filesystem of the N encrypted virtual filesystems;

encrypting the data using a set of cryptographic keys associated with the encrypted virtual filesystem;

determining, by way of a virtual device associated with the set of cryptographic keys, a second location within a sparse file associated with the virtual device, wherein the second location is associated with the first location; and storing the data as encrypted in the second location within sparse file, wherein storing the data modifies the actual size of sparse file but not the apparent size of sparse file.

17. The computer-implemented method of claim 11, further comprising:

obtaining, from an application, a request to read data from a first location in an encrypted virtual filesystem of the N encrypted virtual filesystems;

determining, by way of a virtual device associated with the encrypted virtual filesystem, a second location within sparse file associated with the virtual device, wherein the second location is associated with the first location;

reading the data from the second location within sparse file;

decrypting the data using a set of cryptographic keys associated with the virtual device; and providing, to the application, the data as decrypted.

18. An article of manufacture including persistent storage and a non-transitory computer-readable medium, wherein the persistent storage includes one or more disks providing a parent filesystem with a pre-configured amount of free space, and wherein the non-transitory computer-readable medium has stored thereon program instructions that, upon execution by a computing system, cause the computing system to perform operations comprising:

creating, within the pre-configured amount of free space N sparse files, each with an apparent size equivalent to the pre-configured amount of free space and an actual size based on space used, wherein a sum of the apparent sizes of the N sparse files is greater than the pre-configured amount of free space, where N is at least 2;

creating N virtual devices, one for each of the N sparse files;

establishing N sets of cryptographic keys, one set for each of the N virtual devices;

creating N encrypted virtual filesystems, one for each of the N virtual devices and one within each of the N sparse files; and mounting the N encrypted virtual filesystems within the parent filesystem as one of N child filesystems, wherein each of the N child filesystems uses one of the N sets of cryptographic keys for application-transparent encrypted data storage.

19. The article of manufacture of claim 18, the operations further comprising:

obtaining data, from an application, to write to a first location in an encrypted virtual filesystem of the N encrypted virtual filesystems;

encrypting the data using a set of cryptographic keys associated with the encrypted virtual filesystem;

determining, by way of a virtual device associated with the set of cryptographic keys, a second location within a sparse file associated with the virtual device, wherein the second location is associated with the first location; and storing the data as encrypted in the second location within the sparse file, wherein storing the data modifies the actual size of the sparse file but not the apparent size of the sparse file.

20. The article of manufacture of claim 18, the operations further comprising:

obtaining, from an application, a request to read data from a first location in an encrypted virtual filesystem of the N encrypted virtual filesystems;

determining, by way of a virtual device associated with the encrypted virtual filesystem, a second location within sparse file associated with the virtual device, wherein the second location is associated with the first location;

reading the data from the respective second location within the sparse file;

decrypting the data using a set of cryptographic keys associated with the virtual device; and providing, to the application, the data as decrypted.

* * * * *